United States Patent Office 2,982,515
Patented May 2, 1961

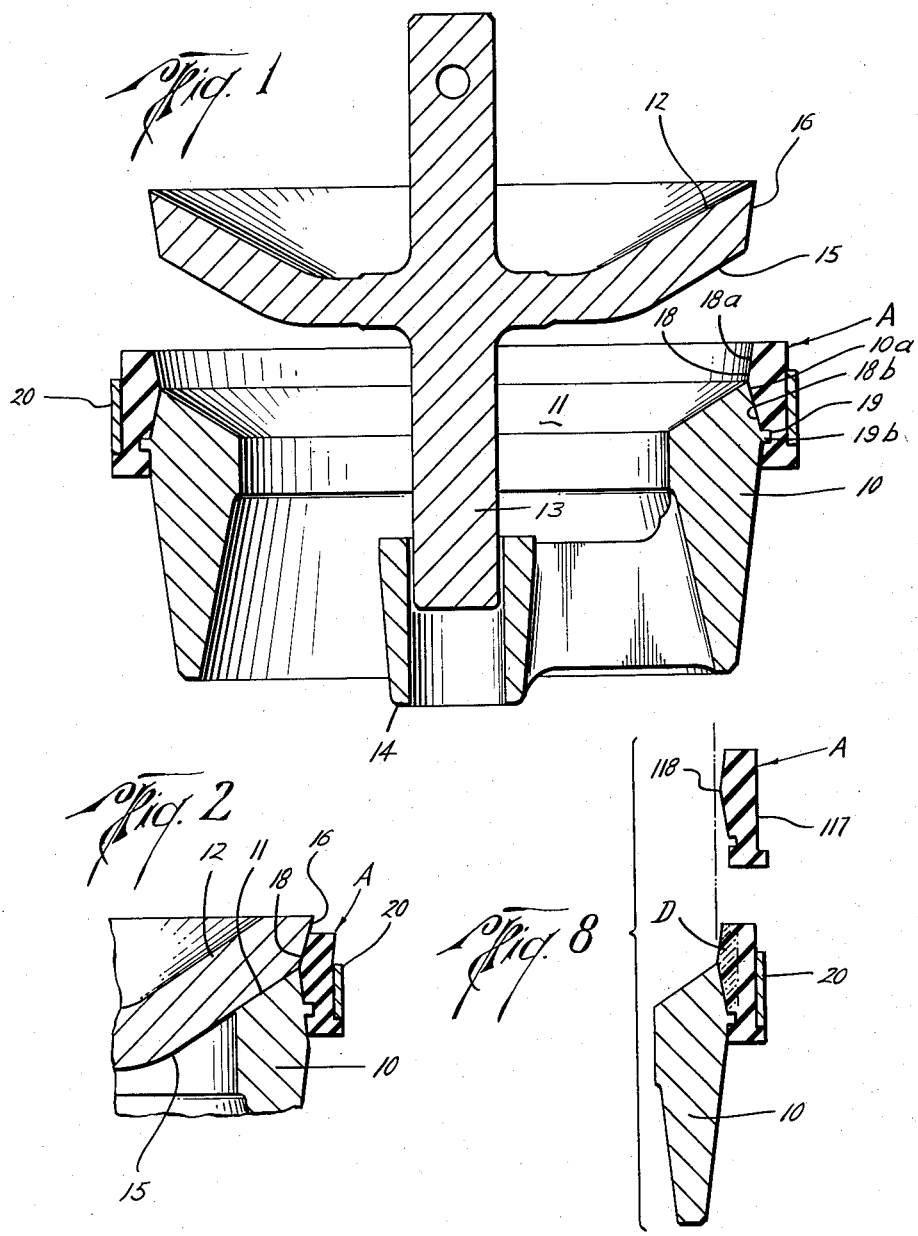

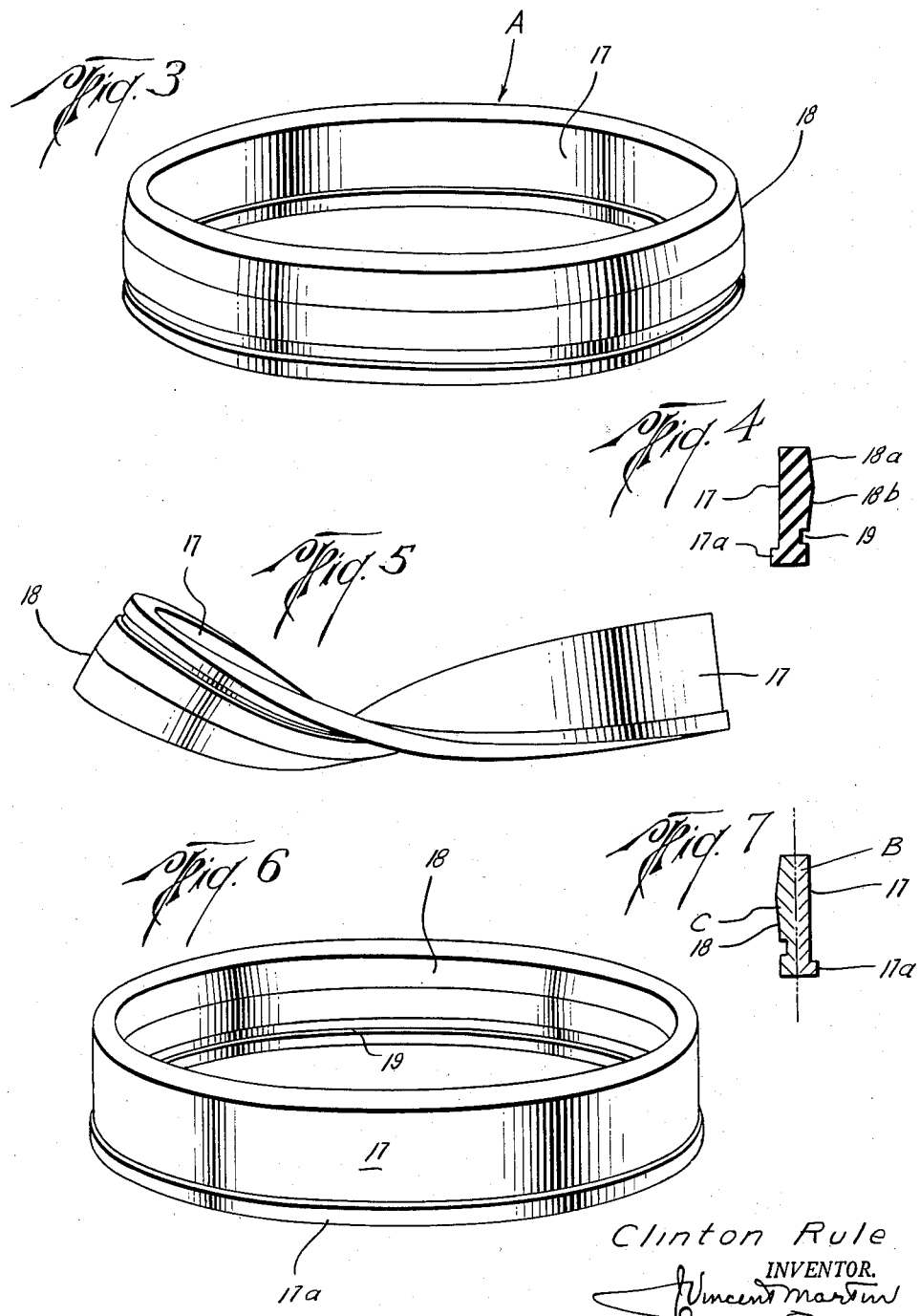

2,982,515
VALVE SEALING ELEMENTS

Clinton Rule, Beverly Farms, Mass., assignor to Mission Manufacturing Company, Houston, Tex., a corporation of Texas Filed Oct. 4, 1957, Ser. No. 688,248
6 Claims. (Cl. 251—332)

This invention relates to new and useful improvements in valve sealing elements.

In various types of valves the valve seat is provided with a sealing element which is mounted to co-act with the valve member to seal against flow past the valve member when the same is in seated position. One example of such valve is shown in the co-pending application of Roberts et al., Serial No. 430,832, filed May 19, 1954, and now abandoned; such a valve assembly includes an annular inclined valve seat which is encircled by an annular sealing ring extending upwardly above said seat, together with a valve element movable relative to both seat and sealing ring. The present invention relates to an improved manner of mounting said sealing ring to lengthen its useful life.

An object is to provide an improved valve assembly having an annular valve seat and an annular sealing element surrounding and extending above said seat, with said sealing element being mounted in final position with the material of the sealing element adjacent its bore or inner periphery under compression, whereby the wearing quality in sealing with a co-acting valve member is improved.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a sectional view of a valve assembly having an annular sealing element mounted on the valve seat body, in accordance with the present invention, the valve member being in an unseated position, Figure 2 is an enlarged sectional view showing the valve in seated position, Figure 3 is an isometric view of the sealing ring showing the same as it is initially formed or molded, Figure 4 is a vertical cross-sectional view of the ring illustrated in Figure 3, Figure 5 is a view, similar to Figure 4, and showing the ring being turned inside out, Figure 6 is a view similar to Figure 4 illustrating the ring after it has been turned inside out, Figure 7 is a vertical cross-sectional view of the ring shown in Figure 6, and Figure 8 is a modification of the invention, illustrating another manner of mounting the ring with the portion adjacent its inner periphery under compression.

In the drawings, the numeral 10 designates a valve seat body or member which is provided with an annular valve seating surface 11 at its upper portion. A valve member 12, having a depending guide pin 13, is movable with respect to the seating surface or valve seat 11 and is guided in its movement by a guide collar 14 through which the guide pin or stem extends. The valve member has an inclined surface 15 which is complementary to the inclination of the valve seat 11 and which is adapted to engage said seat when the valve element is in lowered position. The outer periphery 16 of the valve member is adapted to co-act with the annular sealing ring A which forms the present invention. The particular construction of the valve seat member or of the valve element forms no part of the present invention and is, therefore, subject to variation.

The present invention resides in the manner of forming the annular sealing ring A and the particular method of mounting said ring in position on the valve seat member 10. Referring to Figure 3, the sealing ring A is constructed of a suitable elastic material, such as rubber or rubber compound and is preferably molded. When initially molded, the ring has a surface 17 which may be referred to as the bore of the formed ring. The outer peripheral surface 18 of the formed ring is preferably of the shape shown in Figure 4, said outer periphery being formed by two converging surfaces 18a and 18b, at the lower portion of the outer periphery an annular groove 19 may be formed therein. The bore 17 of the formed ring is preferably substantially straight, that is, parallel to the axis of the ring but, if desired, could be inclined or of other configuration; at its lower portion an annular flange 17a is provided.

When the ring is initially formed, the bore or surface 17 is actually the final outer periphery of the ring while the outer periphery 18 of the formed ring is its bore. In order to reverse the surfaces from the position shown in Figure 3, which represents the ring as it is removed from the mold, the ring is actually inverted or turned inside out as illustrated in Figure 5. When this is done, that surface 17, which defined the bore of the ring in its initial formation, becomes the outer surface or outer periphery of the ring; at the same time, the surface 18, which constituted the outer periphery of the ring upon its initial formation, becomes the bore of said ring. After reversal, the ring appears as in Figure 6. The bore of the ring is formed by the surface 18 while the outer periphery is formed by the surface 17. The inverting of the ring disposes the annular flange 17a on the outer periphery of the ring and locates the annular groove 19 within the bore of said ring.

When the ring is inverted or turned inside out, the surface 17, which was of the smaller diameter immediately following formation of the ring, is moved to the outside of the ring. The larger diameter of the surface 18 is moved into the inside of the ring and this results in the material adjacent the outer periphery being in tension while the material adjacent the bore is in compression. This is clearly indicated in Figure 7, wherein the shaded portion B is in tension and the shaded portion C is in compression.

After the ring has been inverted or turned inside out as above explained, it is placed in position upon the upper end portion of the valve seat member 10. The inclined surface 18b of the bore 18 co-acts with an inclined surface 10a on the valve seat member and the groove 19 engages a projection 19b on the valve seat member. A clamping or retaining ring 20 is then disposed about the ring A in encircling relationship thereto and firmly clamps the ring in position on the valve seat member body. It is noted that the clamping ring 20 is supported by means of the annular flange 17a which is provided on the exterior surface of the ring.

With the ring A mounted in position on the upper end of the body 10, its upper portion projects above the valve seating surface 11, and as shown, that portion of the bore represented by the inclined surface 18a is above the seat. Since the ring has been inverted, the material adjacent the bore of the ring, which is the section generally indicated by C in Figure 7, is under compression. The material adjacent the outer periphery, as generally represented by B in Figure 7, is under tension. When the valve element 12 moves downwardly to engage the seat 11, its outer periphery 16 slidingly engages the surface 18a of the bore 18 of the sealing ring. The purpose of such engagement is to effect a seal between the valve element and the sealing ring. It is well known that an elastic material under compression has improved wearing qualities as distinguished from material in tension. With the present invention, that portion of the ring under compression is contacted or engaged by the valve element and actual tests have shown that the effective life of the ring is greatly increased. By reason of having first formed the ring as shown in Figure 3 and then inverted said ring, the material of the ring adjacent the bore is permanently under compression which improves the wearing qualities and assures proper sealing action throughout the life of the ring. By reason of the material adjacent the outer periphery of the ring being in tension, the inherent action of the material will tend to hold the ring A in tight encircling engagement with the valve seat member body.

Although it is desirable to construct the ring in such manner that it may be inverted so as to permanently place the material adjacent its bore in compression, advantageous results can be accomplished by constructing the ring in the manner shown in Figure 8. In this form, the ring A is molded in substantially its final shape, that is, its bore 118 and its outer periphery 117 are molded as they will be used in final position. However, the bore 118 is made larger than the outer diameter of the member 10 on which the ring is to be mounted. Thus, when the ring is placed in position as shown in the lower portion of Figure 8, the clamping ring 20 must be utilized to force the ring A radially inwardly into tight contact with the member 10. When this occurs, there is a displacement or deformation of the material to place the same in compression and this results in the material adjacent the bore of the ring being in compression, as indicated at D in Figure 8. Being in compression, the material has better wearing quality and the sealing contact with the annular periphery 16 of the valve element 12 will be effective over a long period of time. The form shown in Figure 8 does not provide the advantage of having the material adjacent the outer periphery of the ring in tension but actual practice has shown that it does increase sealing efficiency by maintaining the ring in compression.

The invention is extremely simple but provides an arrangement whereby effective sealing between an elastic ring and a movable valve element may be obtained. Although the sealing ring has been found particularly useful in the type of valve assembly illustrated, said ring may be employed in any environment where a seal between an elastic member and another element is desired.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. In combination with an annular valve seat having a valve member movable relative thereto, an elastic sealing ring surrounding the valve seat and having its upper portion extending in a plane above the seat, that entire portion of the material of the sealing ring which is adjacent the inner periphery of said upper portion of the ring being in compression when said ring is in place, the inner surface of said upper portion providing a sealing surface.

2. The combination with an annular valve seat having a valve member movable relative thereto, of a sealing element comprising an annular ring of elastic material mounted to encircle the valve seat with the upper portion of the ring extending upwardly in a plane above the seat, the inner periphery of said upper portion being engageable with the valve member as said valve member moves to a seated position on the valve seat, the material of said ring adjacent the inner periphery thereof along the entire axial dimension of said upper portion being in compression when the ring is in position encircling said valve seat, the inner surface of said upper portion providing a sealing surface.

3. The combination with an annular valve seat member having an inclined seating surface on its upper end, of a sealing ring mounted on the outer periphery of the valve seat member at its upper portion with the upper portion of said ring extending in a plane above the inclined seating surface of the member, said sealing ring being constructed of an elastic material which has that portion adjacent its inner periphery in compression and which has that portion adjacent its outer periphery in tension when the ring is in position on the valve seat member.

4. The combination with an annular valve seat member having an inclined seating surface on its upper end, of a sealing ring mounted on the outer periphery of the valve seat member at its upper portion with the upper portion of said ring extending in a plane above the inclined seating surface of the member, said sealing ring being constructed of an elastic material which has that portion adjacent its inner periphery and along the entire axial dimension of said upper portion in compression when the ring is in position on the valve seat member, the inner surface of said upper portion providing a sealing surface.

5. In combination with an annular valve seat having a valve member movable relative thereto, an elastic sealing ring surrounding one of said valve seat and valve member and having a portion extending in a plane beyond said one and toward said other of said valve member and valve seat, that entire portion of the material of the sealing ring which is adjacent the inner periphery of said first mentioned portion of the ring being in compression when said ring is in place, the inner surface of said first mentioned portion of the ring providing a sealing surface.

6. The combination with an annular valve seat member having an inclined seating surface on its upper end and a valve member movable relative thereto, of a sealing ring mounted on the outer periphery of one of the valve seat members and the valve member with a portion of said ring extending in a plane beyond said one and toward said other of the valve seat and valve member, said sealing ring being constructed of an elastic material which has that portion adjacent its inner periphery of said first mentioned portion in compression and which has that portion adjacent its outer periphery in tension when the ring is in place.

References Cited in the file of this patent

UNITED STATES PATENTS

| | | |
|---|---|---|
| 1,705,800 | Akeyson | Mar. 19, 1929 |
| 1,947,071 | Walton | Feb. 13, 1934 |
| 1,948,625 | Penick | Feb. 27, 1934 |
| 1,948,628 | Penick | Feb. 27, 1934 |
| 1,966,264 | Roye | July 10, 1934 |
| 2,739,374 | Kaiser | Mar. 27, 1956 |
| 2,803,056 | Brissey | Aug. 20, 1957 |